(12) United States Patent
Kim (10) Patent No.: US 7,688,398 B2
(45) Date of Patent: Mar. 30, 2010

(54) BACKLIGHT ASSEMBLY AND LIQUID CRYSTAL DISPLAY APPARATUS HAVING THE SAME

(75) Inventor: Taek-young Kim, Anyang-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 116 days.

(21) Appl. No.: 11/926,356

(22) Filed: Oct. 29, 2007

(65) Prior Publication Data
US 2008/0111943 A1    May 15, 2008

(30) Foreign Application Priority Data
Nov. 15, 2006    (KR) .................... 10-2006-0112886

(51) Int. Cl.
*G02F 1/1333* (2006.01)
(52) U.S. Cl. .......................... 349/60; 349/58
(58) Field of Classification Search ........... None
See application file for complete search history.

(56) References Cited

U.S. PATENT DOCUMENTS

| | | | |
|---|---|---|---|
| 6,295,105 B1* | 9/2001 | Lee et al. ................. | 349/65 |
| 2005/0001950 A1* | 1/2005 | Kaneko .................... | 349/58 |
| 2005/0062899 A1* | 3/2005 | Fukayama et al. ........ | 349/58 |
| 2006/0044839 A1* | 3/2006 | Choi et al. ............... | 362/634 |
| 2008/0078574 A1* | 4/2008 | Kang et al. .............. | 174/358 |

\* cited by examiner

*Primary Examiner*—Mike Stahl
(74) *Attorney, Agent, or Firm*—F. Chau & Associates, LLC

(57) ABSTRACT

A backlight assembly, which can provide improved display features by preventing a lamp assembly from being loosened from a lower receiving container, and a liquid crystal display apparatus including the backlight assembly. The backlight assembly includes a light guiding plate guiding incident light, a lamp assembly disposed at one or more sides of the light guiding plate, and having at least one lamp to generate light and a lamp cover enclosing the lamp, a lower receiving container having a bottom plane and sidewalls formed around the periphery of the bottom plane and receiving the lamp assembly and the light guiding plate, and at least one elastic and conductive gasket including a hot-melt adhesive agent having a melting point greater than or equal to about 60° C. and interposed between the lamp cover and the lower receiving container.

17 Claims, 9 Drawing Sheets

BACKLIGHT ASSEMBLY AND LIQUID CRYSTAL DISPLAY APPARATUS HAVING THE SAME

CROSS-REFERENCE TO RELATED APPLICATION

This application claims priority from Korean Patent Application No. 10-2006-0112886 filed on Nov. 15, 2006, the disclosure of which is incorporated herein by reference in its entirety.

BACKGROUND OF THE INVENTION

1. Technical Field

The present disclosure relates to a backlight assembly, and more particularly, to a backlight assembly, which can suppress electric noise from being generated during a tapping test, and a liquid crystal display apparatus comprising the backlight assembly.

2. Discussion of the Related Art

Liquid crystal display apparatuses are display devices that consume low power, are light weight, and are small in size relative to conventional displays. Liquid crystal display apparatuses have been applied to a wide range of fields, including computers, electric devices, and information communications technology, and are being widely used in a wide variety of applications, such as portable computers, desktop computer monitors, monitors of high-quality image display devices, and the like.

A liquid crystal display apparatus may include a liquid crystal panel assembly having a liquid crystal panel for displaying image information, a backlight unit having a lamp assembly for emitting light, and a rectangular light guiding plate for guiding light to the liquid crystal panel assembly, and upper, intermediate and lower receiving containers which receive the liquid crystal panel assembly and the backlight unit. The lamp assembly may include a plurality of lamps and a lamp cover made of a conductive material for enclosing the lamps. The lamp cover and the lower receiving container, which are both made of a conductive material, may be in contact with each other.

When a conventional liquid crystal display apparatus is subjected to a tapping test for inspecting the same, an external shock is applied to a liquid crystal panel of the liquid crystal display apparatus, which may cause a lamp cover to be dislodged from the lower receiving container. Since the lamp cover and the lower receiving container are both made of a conductive material, parasitic capacitance may be created therebetween. Thus, if the dislodging occurs, a sharp change in current may occur, which causes noise in signals transmitted to the liquid crystal panel.

SUMMARY OF THE INVENTION

Embodiments of the present invention provide a backlight assembly, which can provide excellent display features by preventing a lamp assembly from being loosened from a lower receiving container, and a liquid crystal display apparatus including the backlight assembly.

According to an exemplary embodiment of the present invention, a backlight assembly includes a light guiding plate guiding incident light, a lamp assembly disposed at one or more sides of the light guiding plate, and having at least one lamp to generate light and a lamp cover enclosing the lamp, a lower receiving container having a bottom plane and sidewalls formed around the periphery of the bottom plane and receiving the lamp assembly and the light guide film, and at least one elastic and conductive gasket including a hot-melt adhesive agent having a melting point of greater than or equal to about 60° C. and interposed between the lamp cover and the lower receiving container.

According to an exemplary embodiment of the present invention, a liquid crystal display apparatus includes a liquid crystal panel for displaying images, and the backlight assembly for providing light to the liquid crystal panel.

BRIEF DESCRIPTION OF THE DRAWINGS

The above and other features of the present invention will become more apparent by describing in detail exemplary embodiments thereof with reference to the accompanying drawings in which.

DETAILED DESCRIPTION OF THE EXEMPLARY EMBODIMENTS

Embodiments of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Like reference numerals may refer to like elements throughout the specification.

A liquid crystal display apparatus according to an exemplary embodiment of present invention will now be described in detail with reference to FIGS. 1 through 8.

Figure 1:
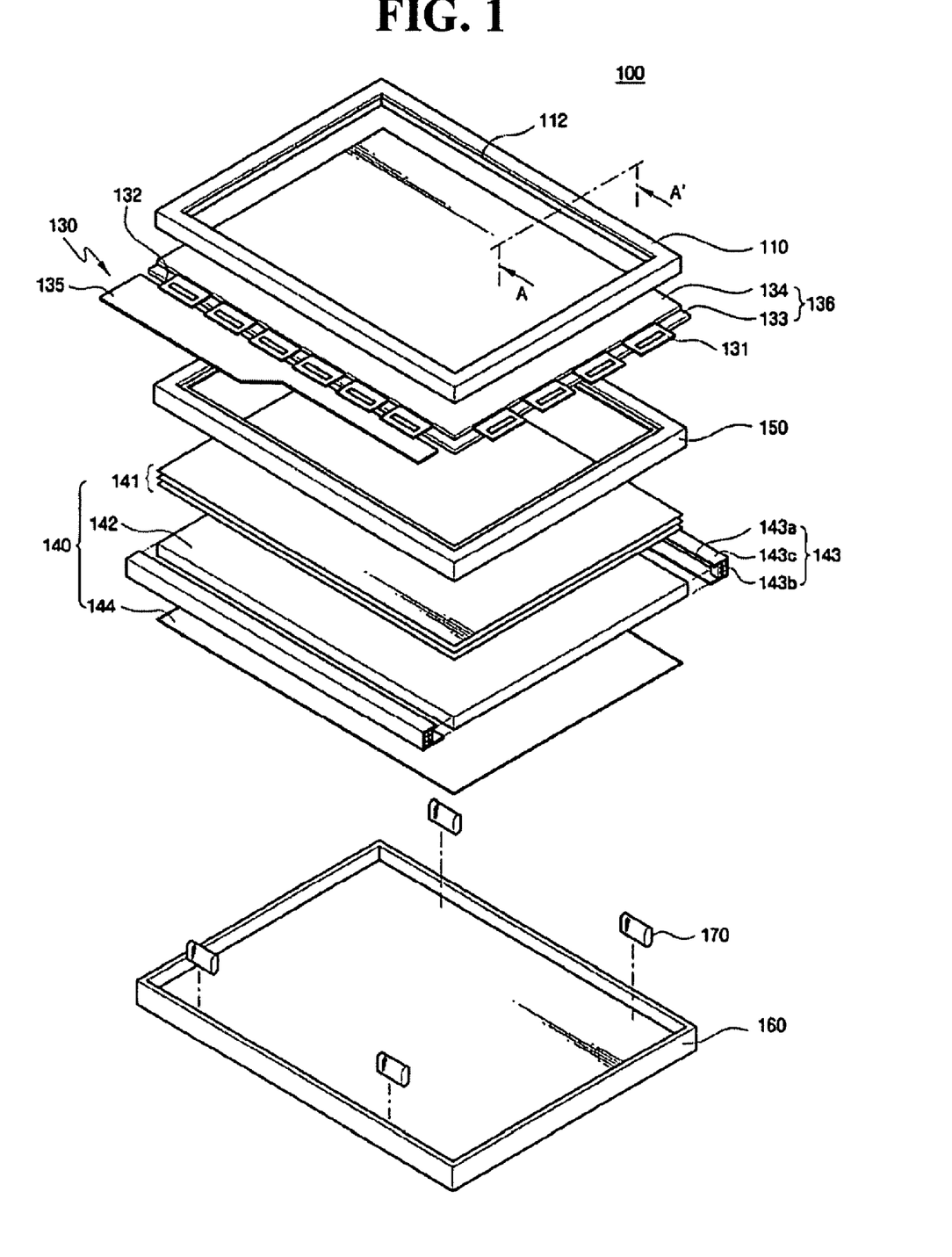
FIG. 1 is an exploded perspective view illustrating a liquid crystal display apparatus according to an exemplary embodiment of present invention.
Figure 2:
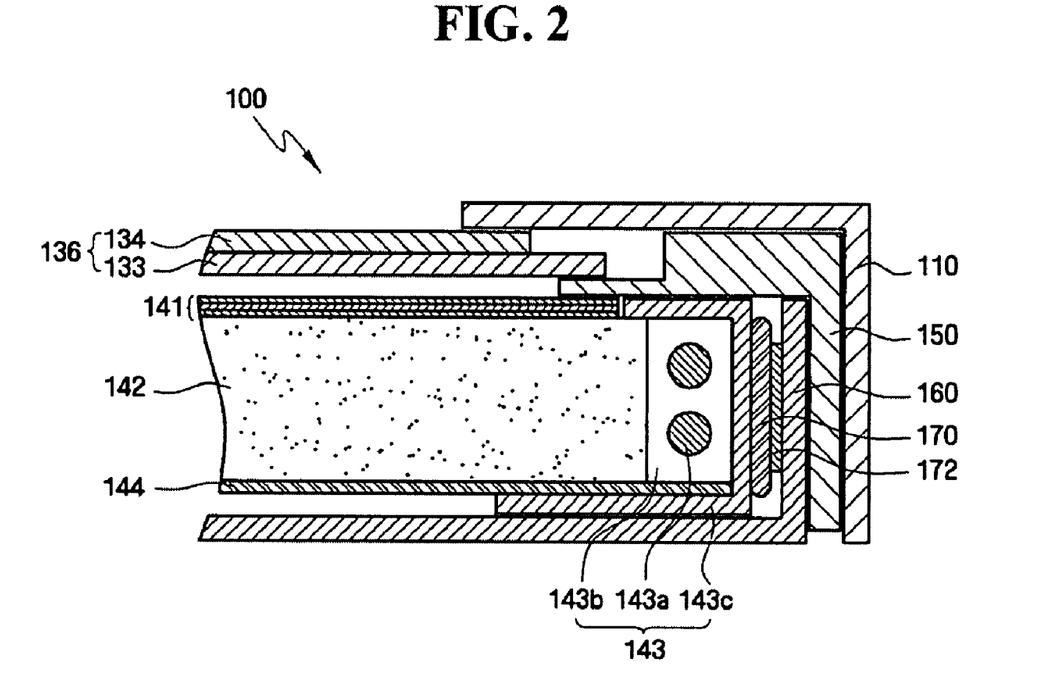
FIG. 2 is a cross-sectional view taken along line A-A' after assembling the liquid crystal display apparatus shown in FIG. 1 according to an exemplary embodiment of the present invention.

FIG. 1 is an exploded perspective view illustrating a liquid crystal display apparatus (100) according to an exemplary embodiment of present invention, and FIG. 2 is a cross-sectional view taken along line A-A' after assembling the liquid crystal display apparatus shown in FIG. 1.

Referring to FIGS. 1 and 2, the liquid crystal display apparatus 100 includes a liquid crystal panel assembly 130, a backlight unit 140, an intermediate receiving container 150, an upper receiving container 110, and a lower receiving container 160. The backlight unit 140, the intermediate receiving container 150 receiving the backlight unit 140, and the lower receiving container 160 comprise a backlight assembly.

The liquid crystal panel assembly 130 includes a liquid crystal panel 136 including a lower substrate 133 and an upper substrate 134, a liquid crystal layer (not shown), a gate chip film package 131, a data chip film package 132, and a printed circuit board 135.

The liquid crystal panel 136 includes a lower panel 133 having gate lines (not shown), data lines (not shown), a thin film transistor (TFT) array and a pixel electrode, an upper panel 134 having color filters, black matrixes, and a common electrode, and facing the lower panel 133. The color filters and the common electrode may also be formed on the lower panel 133.

The gate chip film package 131 is connected to the respective gate lines (not shown) formed on the lower substrate 133, and the data chip film package 132 is connected to the respective data lines (not shown) formed on the lower substrate 133. The gate chip film package 131 and the data chip film package 132 include TAB (Tape Automated Bonding) tapes having interconnection patterns on a base film and semiconductor chips mounted on the interconnection patterns by a TAB technique. Examples of the chip film package include a tape carrier package (TCP), and a chip on film (COF). However, the exemplified chip film package is not limited thereto.

Driving components for processing gate driving signals and data driving signals are mounted on the printed circuit board 135 so that the gate driving signals and the data driving signals are applied to the gate chip film package 131 and the data chip film package 132, respectively.

The backlight unit 140 includes optical sheets 141, a light guiding plate 142, a lamp assembly 143, and a reflection sheet 144.

The light guiding plate 142 guides light supplied to the liquid crystal panel assembly 130. The light guiding plate 142 is a panel including a transparent plastic-based material, e.g., acryl, so that the light generated from the lamps 143a travels toward the liquid crystal panel 136 seated on the light guiding plate 142. Various patterns for changing a direction of propagation of light beams incident onto the light guiding plate 142 toward the liquid crystal panel 136 can be formed on a rear face of the light guiding plate 142 by a printing method.

The lamp assembly 143 includes one or more lamps 143a generating light, a lamp holder 143b into which ends of each of the one or more lamps 143a are inserted, and a lamp cover 143c enclosing the lamps 143a. The lamp holder 143b protects the lamps 143a from damage. The lamp cover 143c includes an open lateral face, the open lateral face is positioned to correspond to a side of the light guide plate 142. The lamp cover 143c internally reflects the light beams emitted from the lamps 143a toward the light guide plate 142 to improve light emission efficiency. An end of the light guide plate 142 can be widthwise fitted into the open lateral face of the lamp cover 143c. Linear light sources such as a Cold Cathode Fluorescent Lamp (CCFL), a Hot Cathode Fluorescent Lamp (HCFL), or an External Electrode Fluorescent Lamp (EEFL), or spot light sources such as a Light Emitting Diode (LED), may be employed as the lamps 143a used as light sources. In order to maintain brightness at a uniform level by evenly distributing internal discharge gases throughout the lamps 143a, the lamps 143a can be arranged in a transverse direction with respect to the longer side of the liquid crystal panel 136.

The reflection sheet 144 is disposed on a bottom surface of the light guiding plate 142 and reflects light upward from below the light guiding plate 142. The reflection sheet 144 reflects the light that is not reflected by patterns formed on the rear surface of the light guiding plate 142, toward an exit face (positioned below the optical sheets) of the light guiding plate 142, thereby reducing loss of light incident into the liquid crystal panel 136 and enhancing the uniformity of light transmitted to the exit face of the light guiding plate 142. The reflection sheet 144 may be inserted into the lamp cover 143c together with the light guiding plate 142.

The optical sheets 141 are disposed on the light guiding plate 142 and serve to diffuse and focus light coming from the light guiding plate 142. The optical sheets 141 include, for example, a diffusion sheet, a prism sheet, and a protection sheet. The diffusion sheet, disposed between the light guiding plate 142 and the prism sheet, diffuses incident light from the light guiding plate 142, thereby preventing partial concentration of light. The prism sheet has trigonal prism patterns formed on its surface in a predetermined arrangement. The prism sheet may be composed of two sheets having prisms alternately arranged at a predetermined angle to focus light diffused by the diffusion sheet in a direction perpendicular to the liquid crystal panel 136. The light that has passed through the prism sheet propagates in a direction substantially perpendicular to the liquid crystal panel 136, thereby obtaining brightness uniformity on the protection sheet. The protection sheet formed on the prism sheet protects a surface of the prism sheet and also enhances the diffusion of light to increase the uniformity of light distribution.

In the case of a small-sized liquid crystal display apparatus, it is often the case that a single lamp is installed on a lateral face of the light guide plate 142. However, in order to achieve sufficient brightness, as shown in FIG. 2, for example, one or more lamps 143a may be installed on the lamp assembly 143 as the size of the liquid crystal display apparatus 100 increases. An inverter (not shown) for applying power to the lamps 143a of the lamp assembly 143 is electrically connected to the lamp assembly 143 via a wire.

The lower receiving container 160 includes a bottom surface, and four sidewalls formed around the edges of the bottom surface. The reflection sheet 144, the lamp assembly 143, the light guide plate 142 and the optical sheets 141 are sequentially received in the lower receiving container 160. In order to provide strength against external shocks and provide a stable ground, the lower receiving container 160 may be formed of a metallic material or the like. The lower receiving container 160 comprises a chassis.

A conductive gasket 170 is interposed between the lamp assembly 143, in particular the lamp cover 143c and the lower receiving container 160. More specifically, the conductive gasket 170 is interposed between the internal surface of the sidewalls of the lower receiving container 160 and the external face of the lamp cover 143c. The gasket 170 electrically connects the lamp cover 143c with the lower receiving container 160. In addition, the gasket 170 has elasticity, and, thereby, prevents the lamp assembly 143 from being separated from the lower receiving container 160.

Since the lamp cover 143c and the lower receiving container 160 comprise a conductive material, a parasitic capacitor is created between the lamp cover 143c and the lower receiving container 160. As a result, in an event where dislodging occurs between the lamp cover 143c and lower receiving container 160, a rapid change in the current may be caused, resulting in noise in signals transmitted to the liquid crystal panel 136. However, according to embodiments of the present invention, it is possible to prevent the lamp cover 143c from being loosened from the lower receiving container 160 during a tapping test of the liquid crystal display apparatus 100 or in a case of an external shock applied to the liquid crystal display apparatus 100, by interposing the conductive gasket 170 between the lamp cover 143c and the lower receiving container 160, thereby preventing an instantaneous current change from occurring. In such a manner, it is possible to prevent noise from being generated in the liquid crystal panel 136.

Figure 3:
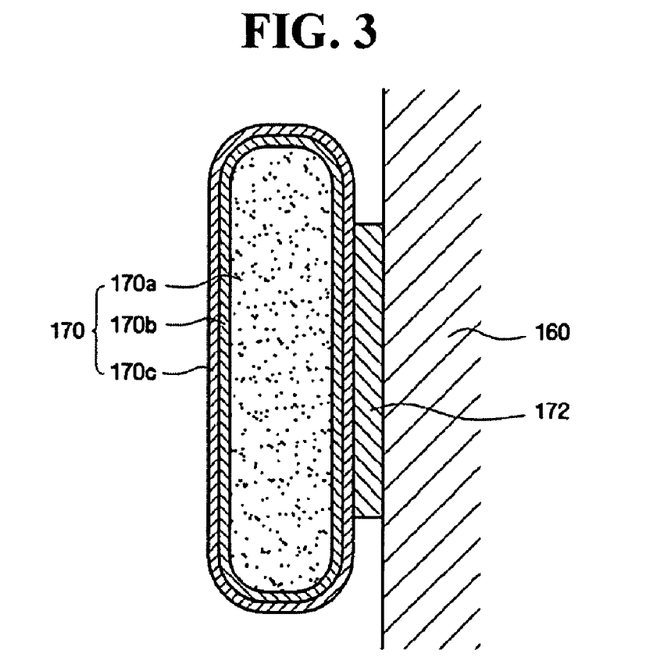
FIG. 3 is an enlarged view of a gasket shown in FIG. 2 according to an exemplary embodiment of the present invention.

As shown in FIG. 3, the gasket 170 includes an elastomer 170a having elasticity, a conductive fabric 170c surrounding the elastomer 170a, and a hot-melt adhesive agent 170b interposed between the elastomer 170a and the conductive fabric 170c and adhering the elastomer 170a and the conductive fabric 170c to each other.

The elastomer 170a may comprise, for example, polyurethane.

The conductive fabric 170c electrically connects the lower receiving container 160 and the lamp cover 143c to each other. The conductive fabric 170c may be formed by coating a fabric made of, for example, polyester, with copper (Cu). In order to ensure corrosion resistance, nickel (Ni), gold (Au), or the like, may be further coated on the resultant product coated with copper.

The hot-melt adhesive agent 170b is melted by applying heat thereto to adhere the conductive fabric 170c to the elastomer 170a. During the operation of the liquid crystal display apparatus 100, the internal temperature of the liquid crystal display apparatus 100, in particular, the temperature of a region adjacent to the lamp assembly rises up to about 50 to about 60° C. Accordingly, to prevent the hot-melt adhesive agent 170b from melting during the operation of the liquid crystal display apparatus 100, the melting point of the hot-melt adhesive agent 170b exceeds about 60° C. For example, the melting point of the hot-melt adhesive is greater than about 100° C. Examples of a hot-melt adhesive agent 170b having such a property include co-polyester, and the like. The melting point of co-polyester is about 116° C.

If the hot-melt adhesive agent 170b is melted in a state in which the gasket 170 is compressed between the lamp cover 143c and the lower receiving container 160, the elastomer 170a may absorb components of the hot-melt adhesive agent 170b, so that the elastomer 170a is solidified in a compressed state, thereby causing the gasket 170 to lose its elasticity. If the gasket 170 loses its elasticity, a crevice is created between the lamp assembly 143 and the lower receiving container 160, thereby loosening the lamp assembly 143 from the lower receiving container 160, ultimately causing noise in signals transmitted to the liquid crystal panel 136. Therefore, the hot-melt adhesive agent 170b should be kept in a non-melted state during the operation of the liquid crystal display apparatus 100.

The gasket 170 and the lower receiving container 160 are electrically and physically connected to each other using a conductive tape 172.

Restoration ratios of the gasket 170 shown in FIG. 3 will now be described with reference to Table 1.

Five (5) gasket samples were prepared and the heights thereof were measured in the following manner. That is, the respective gasket samples were compressed until a thickness of each of the gasket samples reached 70% of an initial thickness thereof, the compressed state was maintained at 60° C. for 1 hour, and the thicknesses were measured. Table 1 shows restoration ratios of the respective gasket samples.

TABLE 1

| Type | Thickness before experiment ($t_0$)(mm) | Thickness after experiment ($t_1$)(mm) | Restoration ratio (%) |
|---|---|---|---|
| Gasket sample 1 | 1.07 | 0.92 | 85.98 |
| Gasket sample 2 | 1.1 | 0.88 | 80.00 |
| Gasket sample 3 | 1.1 | 0.87 | 79.09 |
| Gasket sample 4 | 1.09 | 0.9 | 82.57 |
| Gasket sample 5 | 1.08 | 0.88 | 81.48 |
| Average | 1.09 | 0.89 | 81.82 |

(Restoration ratio (%) = {Thickness after experiment ($t_1$)/Thickness before experiment ($t_0$)} × 100)

As shown in Table 1, the gasket according to embodiments of the present invention has a restoration ratio of not less than about 80% even after the compressed state is maintained at 60° C. for 1 hour.

Referring back to FIGS. 1 and 2, the intermediate receiving container 150 has four sidewalls so as to have a rectangular-shaped frame. The intermediate receiving container 150 is disposed at an external face of the sidewalls of the lower receiving container 160. Protrusions are provided on the inner walls of the intermediate receiving container 150 so that the liquid crystal panel 136 can be seated on the protrusions. In addition, the external faces of the sidewalls of and the top face of the lower receiving container 160 are surrounded by the sidewalls and the protrusions of the intermediate receiving container 150. The protrusions of the intermediate receiving container 150 also fix the lamp assembly 143 received in the lower receiving container 160.

The liquid crystal panel 136 is disposed on the protection sheet and housed within the intermediate receiving container 150. In order to prevent components fixed by the intermediate receiving container 150 from being damaged, the intermediate receiving container 150 may be a plastic mold frame.

The upper receiving container 110 covers the top face of the liquid crystal panel 136 received in the intermediate receiving container 150 is combined with the lower receiving container 160. A window 112 exposing the liquid crystal panel 136 is formed on the top face of the upper receiving container 110. Like the lower receiving container 160, the upper receiving container 110 may be formed of a metallic material or the like. The upper receiving container 110 comprises a chassis, in order to achieve strength against external shocks and grounding capacity.

The upper receiving container 110 may be combined with the lower receiving container 160 using hooks. For example, hooks (not shown) are provided along the external face of the sidewalls of the lower receiving container 160 and hook insertion holes (not shown) corresponding to the hooks may be provided on the lateral face of the upper receiving container 110. Thus, as the upper receiving container 110 is combined with receiving container 160, the hooks provided on the lower receiving container 160 are fitted into the hook insertion holes of the upper receiving container 110, thereby combining the lower receiving container 160 and the upper receiving container 110. In addition to the illustrated example, the combination between the upper receiving container 110 and the lower receiving container 160 may be modified in various manners.

The printed circuit board 135 of the liquid crystal panel assembly 130 is bent along the external face of the intermediate receiving container 150 and is seated on the lateral face or the rear surface of the lower receiving container 160. The shape of the lower receiving container 160 may vary according to the manner in which the backlight unit 140 or the liquid crystal panel assembly 130 is received in the lower receiving container 160.

Figure 4:
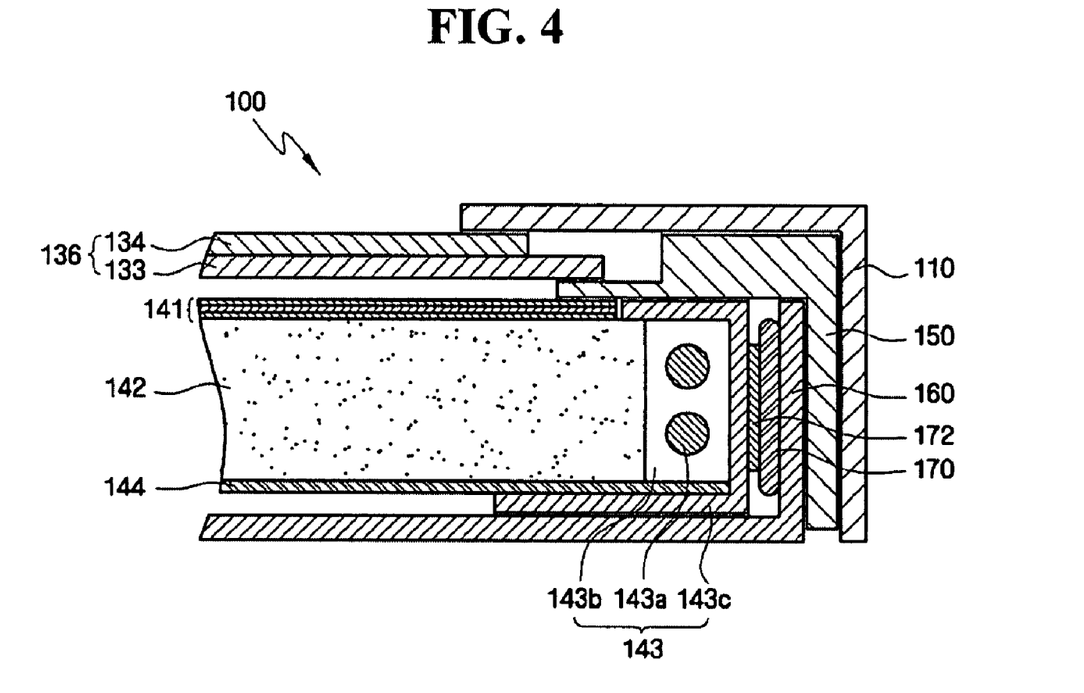
FIG. 4 is a cross-sectional view taken along line A-A' after assembling the liquid crystal display apparatus shown in FIG. 1 according to an exemplary embodiment of the present invention.

While the embodiment described in connection with FIGS. 1-3 illustrates the gasket 170 as being attached to the internal surface of the sidewalls of the lower receiving container 160 using the conductive tape 172, the invention is not limited thereto. For example, as shown in FIG. 4, the gasket 170 may first be attached to the external face of the lamp cover 143c using the conductive tape 172, and the lamp assembly 143 and the gasket 170 are then received in the lower receiving container 160, thereby electrically connecting the lamp cover 143c with the lower receiving container 160.

Figure 5:
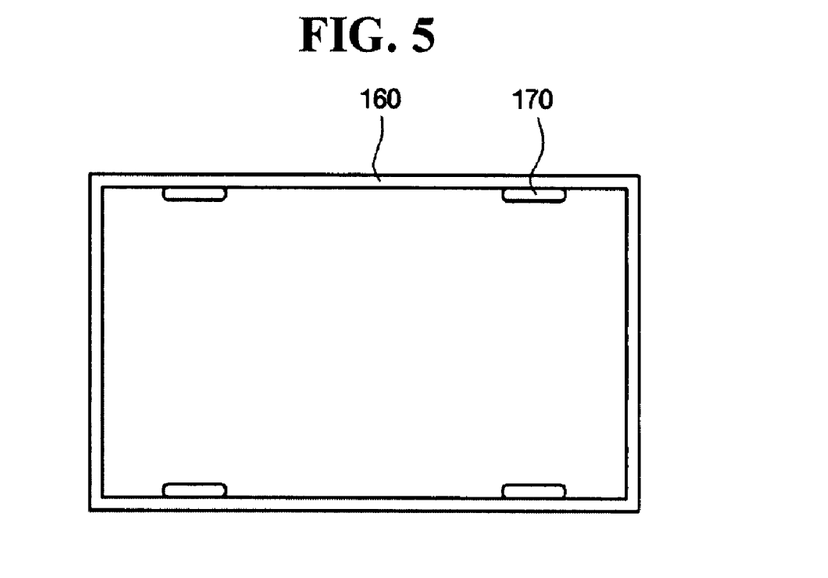
FIG. 5 is a plan view illustrating a gasket and a lower receiving container according to an exemplary embodiment of the present invention.

A positional relationship between the gasket 170 and the lower receiving container 160 will now be described with reference to FIGS. 1 and 5. FIG. 5 is a plan view illustrating the gasket and the lower receiving container shown in FIG. 1.

As shown in FIGS. 1 and 5, a plurality of gaskets 170, for example, two gaskets 170, are disposed at each of a pair of lamp assemblies 143. Accordingly, the gaskets 170, which are elastic and conductive, are arranged between the pair of lamp assemblies 143 positioned at opposite sides of the light guide plate 142 and the longer sidewalls of the lower receiving container 160 disposed adjacent to the lamp assemblies 143, thereby effectively preventing the lamp assemblies 143 from being loosened or dislodged from the lower receiving container 160.

Figure 6:
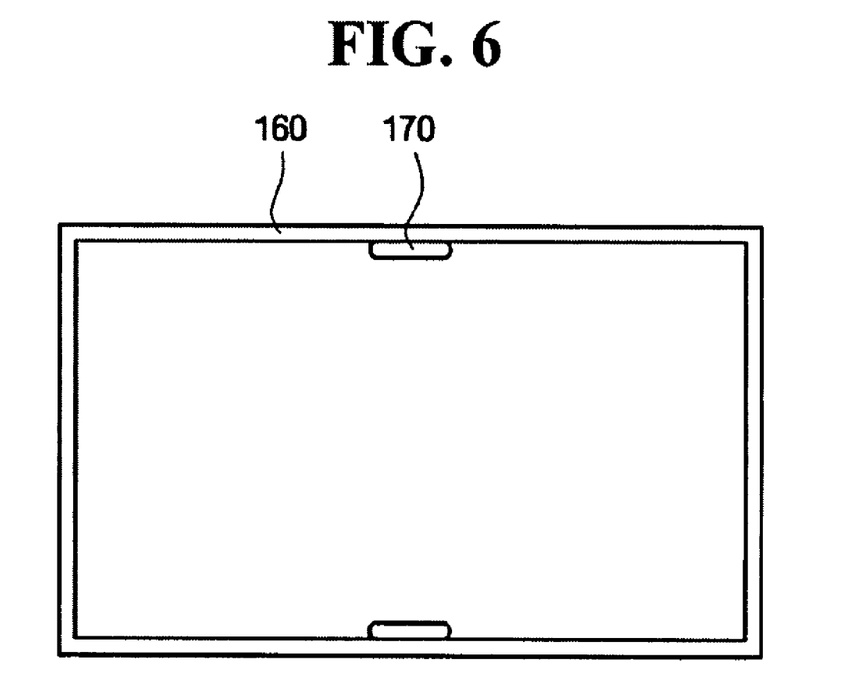
FIGS. 6 through 8 are plan views illustrating a gasket and a lower receiving container according to exemplary embodiments of the present invention.
Figure 7:
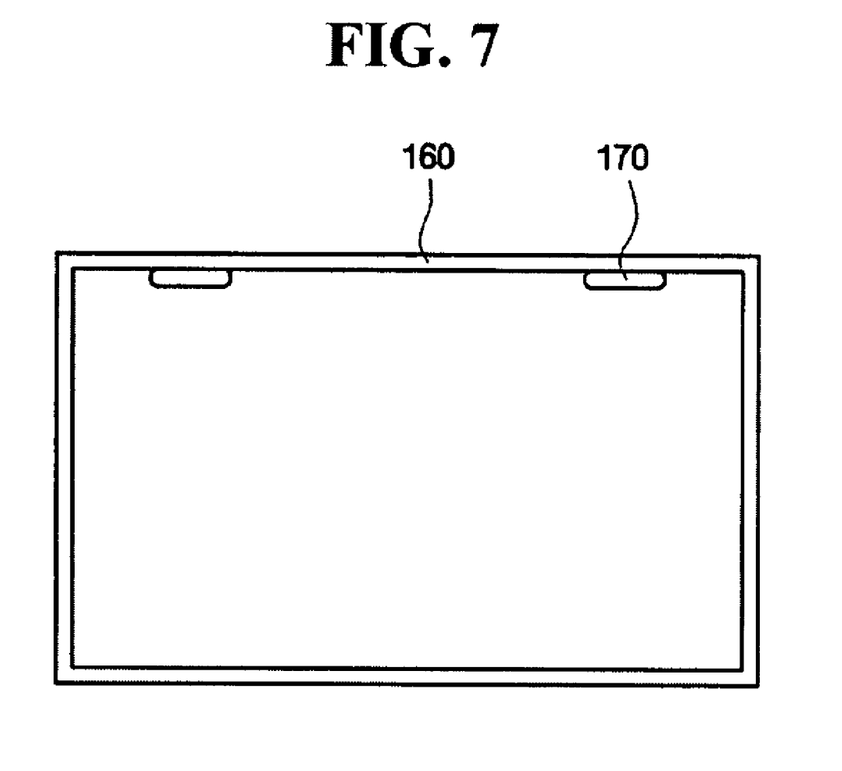
Figure 8:
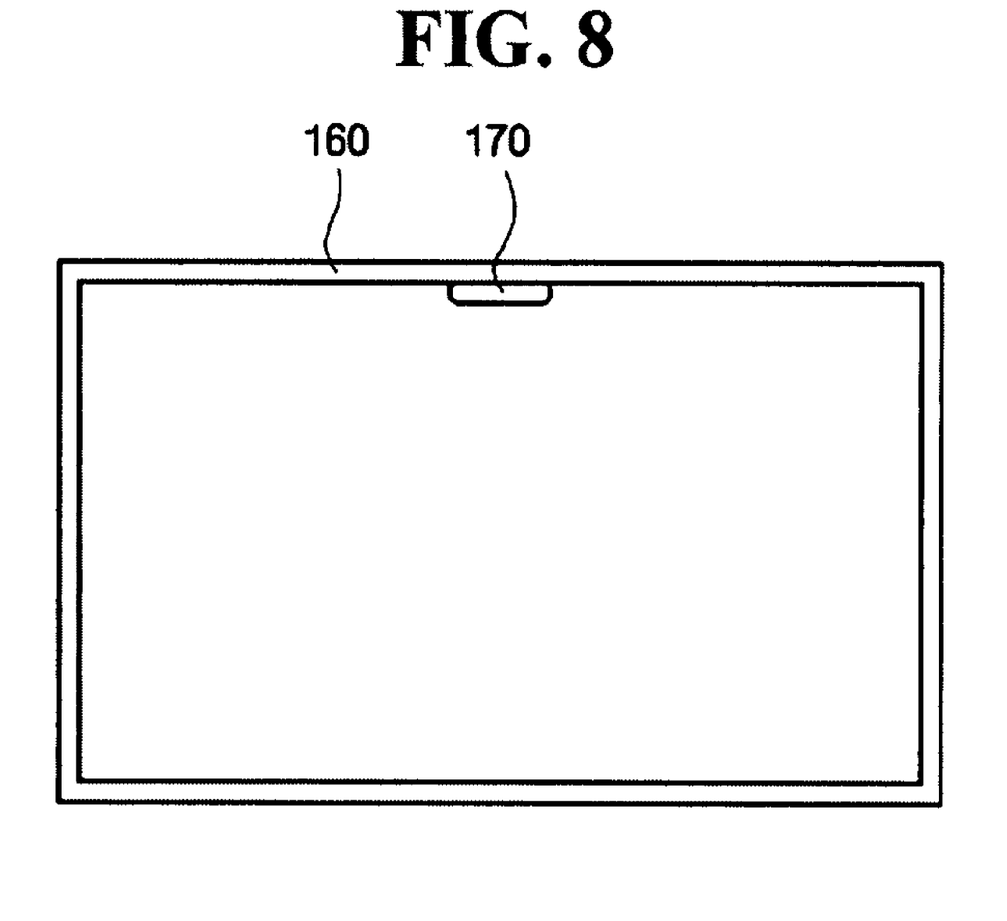

However, the invention is not limited to the illustrated position and the number of gaskets and may be modified in various manners as shown in FIGS. 6 through 8.

As shown in FIG. 6, one gasket 170 may be provided at each of a pair of lamp assemblies. In addition, as shown in FIG. 7, two gaskets 170 may be provided at one of the pair of lamp assemblies. As shown in FIG. 8, one gasket 170 may be provided at one of the pair of lamp assemblies.

Figure 9:
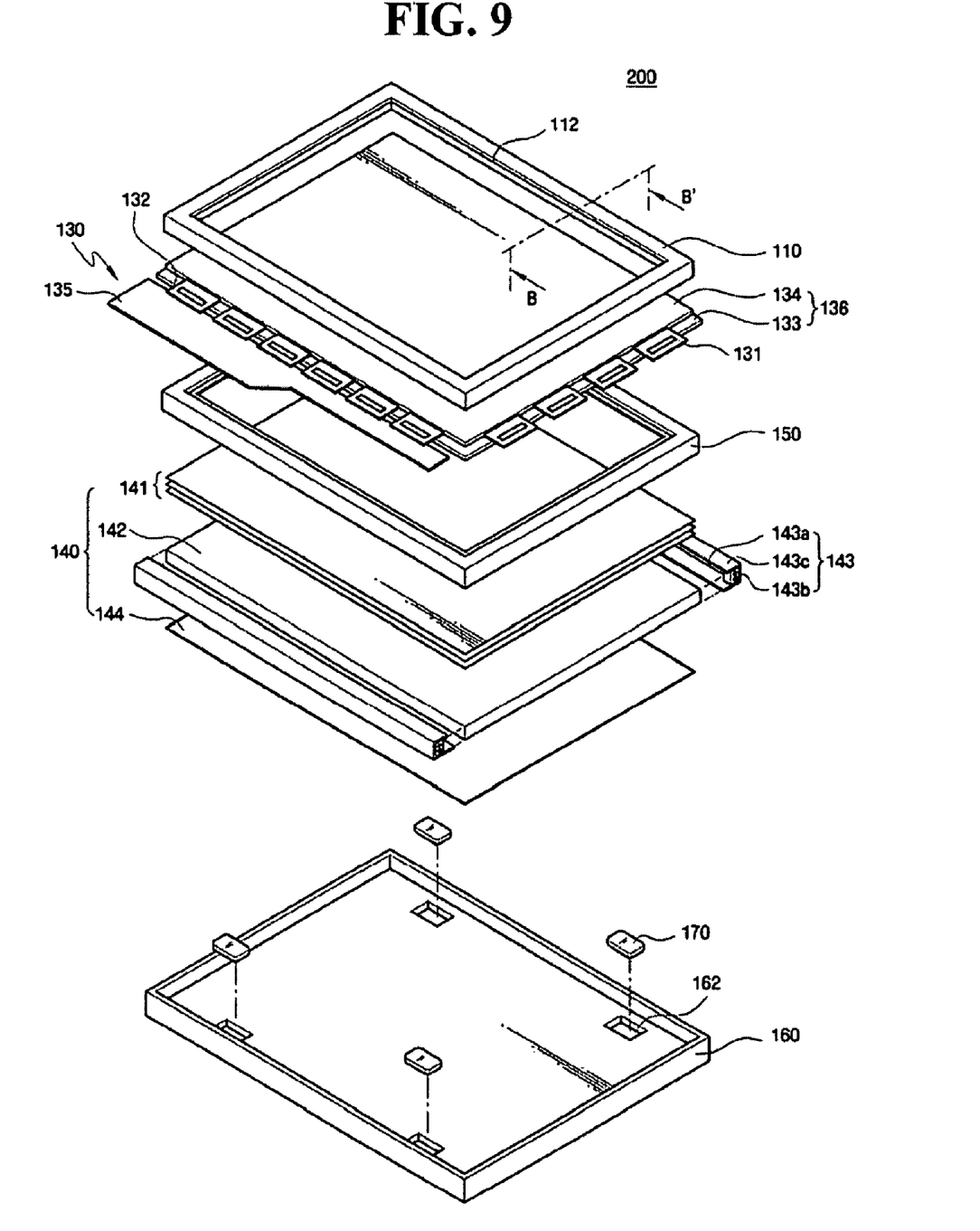
FIG. 9 is an exploded perspective view illustrating a liquid crystal display apparatus according to an exemplary embodiment of present invention.
Figure 10:
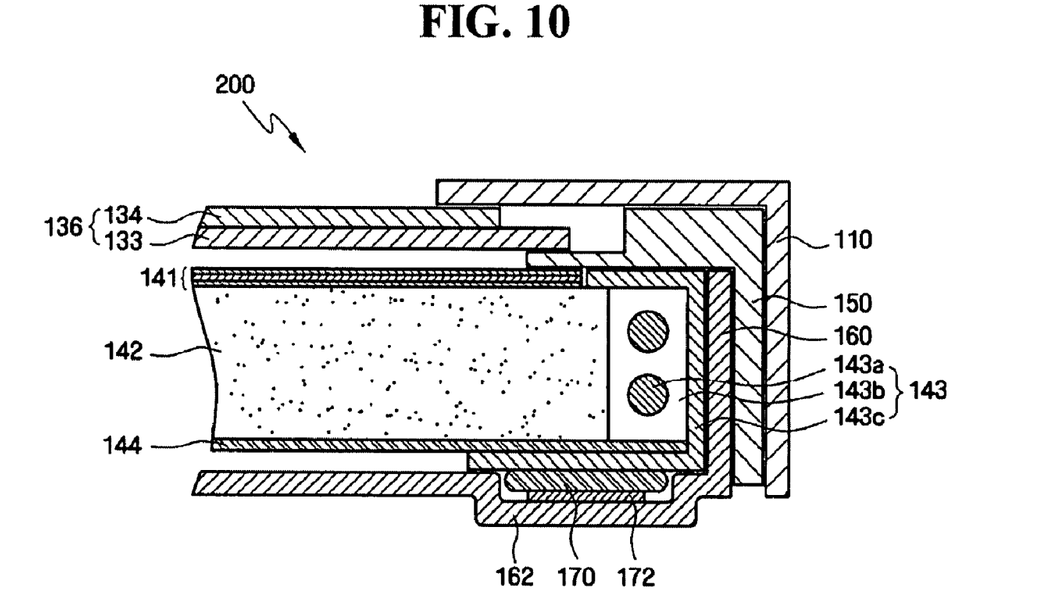
FIG. 10 is a cross-sectional view taken along line B-B' after assembling the liquid crystal display apparatus shown in FIG. 9 according to an exemplary embodiment of the present invention.

Hereinafter, a liquid crystal display apparatus according to an exemplary embodiment of the present invention will be described with reference to FIGS. 9 through 15. FIG. 9 is an exploded perspective view illustrating a liquid crystal display apparatus according to an exemplary embodiment of present invention, and FIG. 10 is a cross-sectional view taken along line B-B' after assembling the liquid crystal display apparatus shown in FIG. 9. Components having the same or similar function as described in connection with FIGS. 1 through 8 are identified by the same reference numerals, and their descriptions will not be repeated.

Referring to FIGS. 9 and 10, a gasket groove 162 is formed on the bottom face of the lower receiving container 160 and the gasket 170 is placed in the gasket groove 162. The gasket 170 is interposed between the bottom face of the lamp cover 143c and the bottom face of the lower receiving container 160 so as to electrically connect the lamp cover 143c with the lower receiving container 160. The protrusions of the intermediate receiving container 150 press the lamp cover 143c downward and the elastic gasket 170 presses the lamp cover 143c upward. In such a manner, it is possible to effectively prevent the lamp assembly 143 from being loosened or dislodged from the lower receiving container 160. Accordingly, noise in signals transmitted to the liquid crystal panel 136 can be avoided If the gasket 170 is interposed between the bottom face of the lower receiving container 160 and the lamp cover 143c without using a groove 162, the reflection sheet 144 may wrinkle. In the case where the groove 162 is omitted, since the gasket 170 has a predetermined thickness, a distance between the bottom face of the lower receiving container 160 and the light guide plate 142 increases, and pressure applied to the reflection sheet 144 increases. Accordingly, where internal heat is generated in a liquid crystal display apparatus 200 during operation, the reflection sheet 144 may be wrinkled. However, it is possible to prevent wrinkling of the reflection sheet 144 and prevent the lamp assembly 143 from being loosened or dislodged from the lower receiving container 160 by forming the gasket groove 162 on the bottom face of the lower receiving container 160 and disposing the gasket 170 therein.

Figure 11:
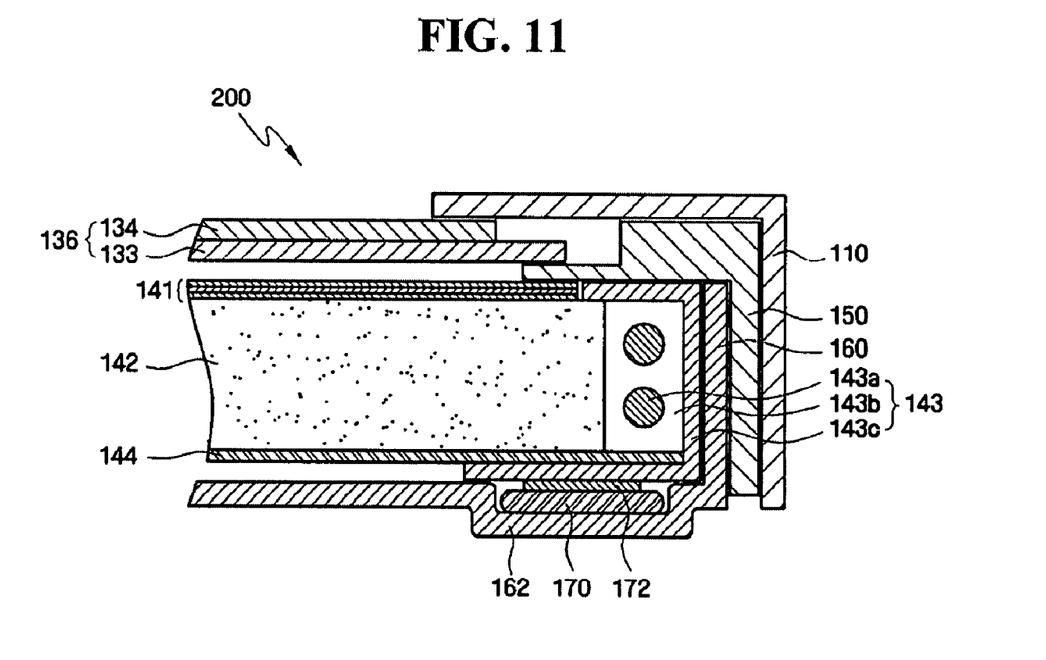
FIG. 11 is a cross-sectional view taken along line B-B' after assembling the liquid crystal display apparatus shown in FIG. 9 according to an exemplary embodiment of the present invention.
Figure 12:
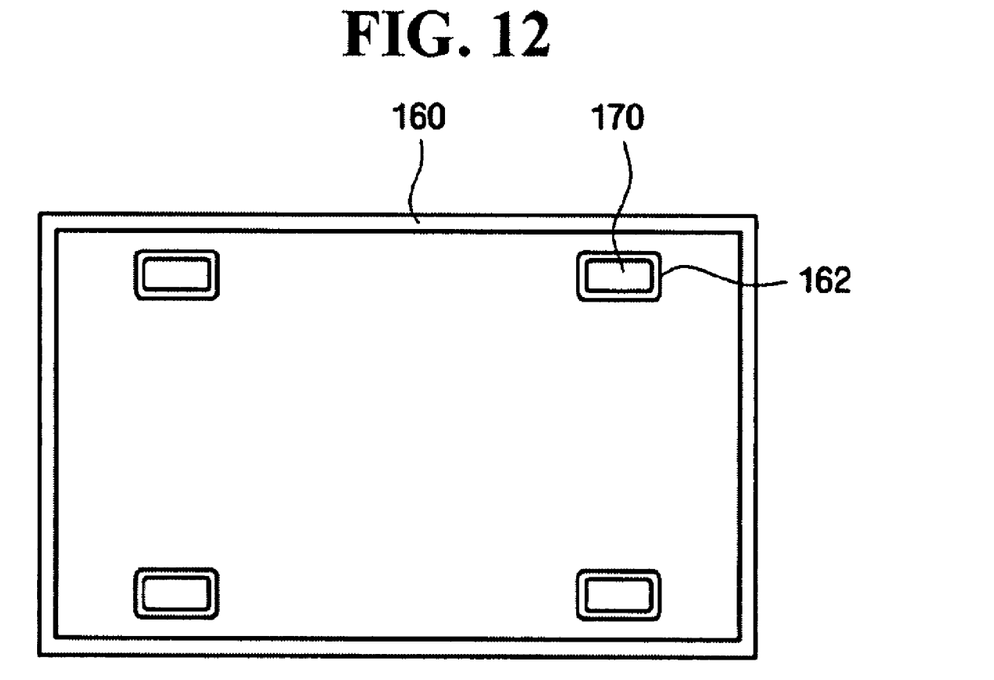
FIG. 12 is a plan view illustrating a gasket and a lower receiving container according to an exemplary embodiment of the present invention.

The gasket 170 is fitted into the gasket groove 162 using the conductive tape 172, but the invention is not limited thereto. For example, as shown in FIG. 11, the gasket 170 is first attached to the bottom surface of the lamp cover 143c using the conductive tape 172, and the lamp assembly 143 and the gasket 170 are then received in the lower receiving container 160, thereby electrically connecting the lamp cover 143c with the lower receiving container 160. A positional relationship between the gasket 170 and the lower receiving container 160 will now be described with reference to FIGS. 9 and 12. FIG. 12 is a plan view illustrating the gasket and the lower receiving container shown in FIG. 9.

As shown in FIGS. 9 and 12, the gasket 170 comprises two gaskets disposed at each of a pair of lamp assemblies 143. Accordingly, the gaskets 170, which are elastic and conductive, are arranged between the pair of lamp assemblies 143 positioned at opposite sides of the light guide plate 142 and the bottom face of the lower receiving container 160 is disposed adjacent to the lamp assemblies 143, thereby effectively preventing the lamp assemblies 143 from being loosened or dislodged from the lower receiving container 160.

Figure 13:
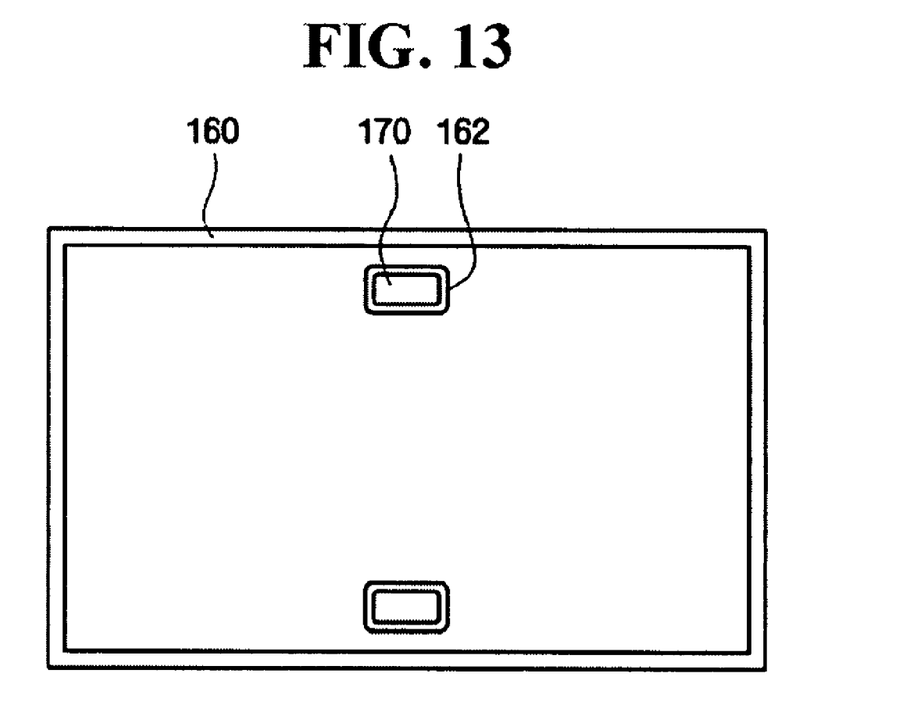
FIGS. 13 through 15 are plan views illustrating a gasket and a lower receiving container according to exemplary embodiments of the present invention.
Figure 14:
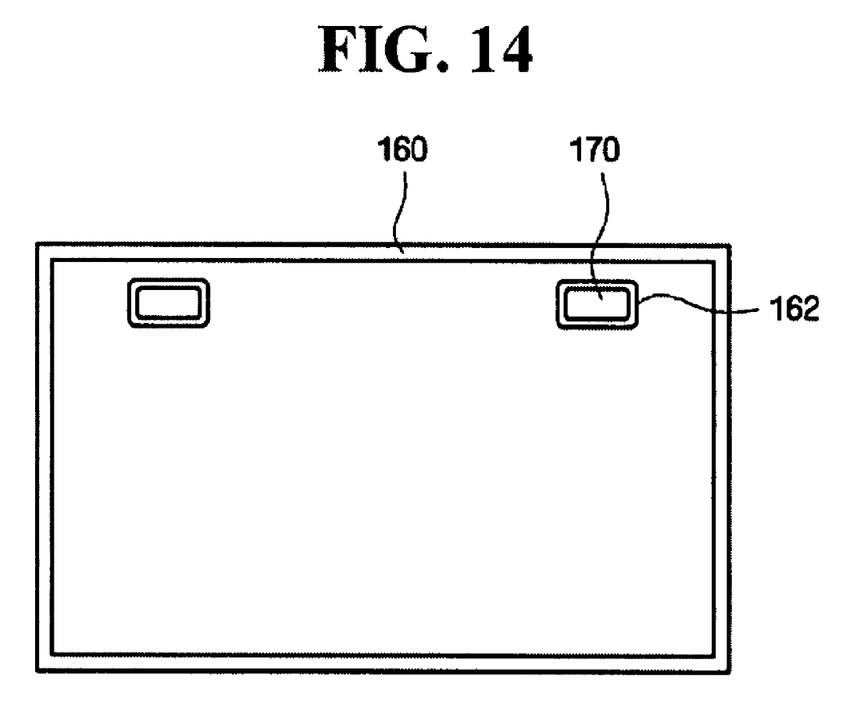
Figure 15:
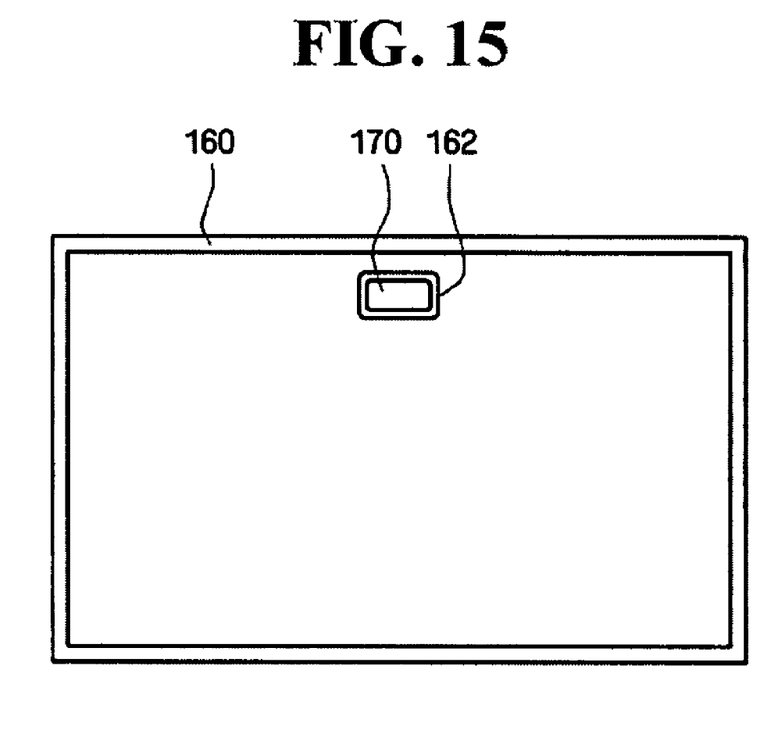

However, the invention is not limited to the illustrated positions and numbers of gaskets and may be modified in various manners as shown in FIGS. 13 through 15.

As shown in FIG. 13, one gasket 170 may be provided at each of a pair of lamp assemblies. In addition, as shown in FIG. 14, two gaskets 170 may be provided at one of the pair of lamp assemblies. As shown in FIG. 15, one gasket 170 may be provided at one of the pair of lamp assemblies.

While the embodiments illustrate a flat-type backlight assembly having lamp assemblies provided at opposite sides of a flat-surfaced light guide plate, the invention is not limited thereto and may also be applied to a wedge-type backlight assembly having a lamp assembly provided at one side of a light guide plate.

As described above, a backlight assembly and a liquid crystal display apparatus according to the embodiments of the present invention can provide improved display features by preventing a lamp assembly from being loosened or dislodged from a lower receiving container.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight assembly comprising:
   a light guiding plate;
   a lamp assembly disposed at one or more sides of the light guiding plate, and having at least one lamp and a lamp cover enclosing the lamp;
   a lower receiving container having a bottom plane and sidewalls formed around the periphery of the bottom plane and receiving the lamp assembly and the light guiding plate, and
   at least one elastic and conductive gasket including an adhesive agent having a melting point of greater than or equal to 60° C., wherein the gasket is interposed between the lamp cover and the lower receiving container.

2. The backlight assembly of claim 1, wherein the gasket includes an elastomer, a conductive fabric covering the elastomer, and the adhesive agent interposed between the elastomer and the conductive fabric.

3. The backlight assembly of claim 2, wherein the elastomer comprises polyurethane.

4. The backlight assembly of claim 2, wherein the conductive fabric includes copper coated on a polyester fabric.

5. The backlight assembly of claim 4, wherein nickel or gold is coated on the copper.

6. The backlight assembly of claim 1, wherein the adhesive agent comprises co-polyester.

7. The backlight assembly of claim 6, wherein the adhesive agent has a melting point greater than or equal to 100° C.

8. The backlight assembly of claim 1, wherein the gasket is interposed between the lamp cover and an internal surface of the sidewalls of the lower receiving container.

9. The backlight assembly of claim 8, wherein the lamp assembly includes a pair of lamp assemblies formed at opposite sides of the light guiding plate, and the gasket is formed at each of the sidewalls of the lower receiving container disposed adjacent to the pair of lamp assemblies.

10. The backlight assembly of claim 1, wherein the gasket is interposed between the lamp cover and the bottom face of the lower receiving container.

11. The backlight assembly of claim 10, wherein a gasket groove for receiving the gasket is formed on the bottom face of the lower receiving container.

12. The backlight assembly of claim 10, wherein the lamp assembly is a pair of lamp assemblies formed at opposite sides of the light guiding plate, and the gasket is formed on each portion of the bottom face of the lower receiving container disposed adjacent to the pair of lamp assemblies.

13. The backlight assembly of claim 10, further comprising an intermediate receiving container disposed at an external face of the lower receiving container, and exerting pressure on the lamp assembly.

14. The backlight assembly of claim 1, wherein the gasket is attached to the lower receiving container using a conductive tape.

15. The backlight assembly of claim 1, wherein the gasket is attached to the lamp cover using a conductive tape.

16. The backlight assembly of claim 1, further comprising a reflection sheet inserted into the lamp cover together with the light guiding plate, wherein the reflection sheet reflects light toward the light guiding plate.

17. A liquid crystal display apparatus comprising:
    a liquid crystal panel for displaying images; and
    a backlight assembly for providing light to the liquid crystal panel, the backlight assembly comprising:
       a light guiding plate;
       a lamp assembly disposed at one or more sides of the light guiding plate, and having at least one lamp and a lamp cover enclosing the lamp;
       a lower receiving container having a bottom plane and sidewalls formed around the periphery of the bottom plane and receiving the lamp assembly and the light guiding plate, and
       at least one elastic and conductive gasket including an adhesive agent having a melting point of greater than or equal to 60° C.,
    wherein the gasket is interposed between the lamp cover and the lower receiving container.

* * * * *